United States Patent Office 3,187,008
Patented June 1, 1965

3,187,008
PROCESS FOR PREPARING SULPHATED INNER SULPHONIUM SALTS
William Baird, John Woolley Batty, Alexander Parkinson, and Kenneth Arthur Williams, all of Manchester, England, assignors to Imperial Chemical Industries Limited, London, England, a corporation of Great Britain
No Drawing. Filed July 2, 1962, Ser. No. 207,016
Claims priority, application Great Britain, July 27, 1961, 27,249/61; Oct. 2, 1961, 35,496/61
16 Claims. (Cl. 260—327)

This invention relates to the preparation of sulphated sulphonium salts.

According to the present invention we provide a process for the preparation of sulphated sulphonium inner salts by the reaction of sulphonium salts which have a cation of the following general formula:

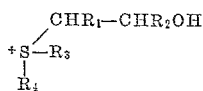

wherein $R_1$, $R_2$, $R_3$, and $R_4$ are as hereinafter defined with a sulphating agent in which the reaction mixture is maintained in a fluid easily stirrable condition by employing a sulphonium salt which is fluid under the reaction conditions and/or by employing an inert miscible diluent for the sulphation mass, and in which the sulphation reaction may optionally be carried out in the presence of an inert diluent which is immiscible with the sulphation mass.

In the above formula $R_1$ and $R_2$ may be hydrogen or a lower alkyl group and may be the same or different, the lower alkyl group preferably containing from 1 to 3 carbon atoms. $R_3$ and $R_4$ may be straight or branched chain substituted or unsubstituted alkyl, or substituted or unsubstituted alkenyl, aryl, aralkyl, alicyclic, or heterocyclic groups as defined below the same or different.

The straight or branched chain alkyl groups from which $R_3$ and $R_4$ may be selected may contain up to 22 carbon atoms but it is preferred that they contain from 1 to 18 carbon atoms. By a substituted alkyl group we mean the group ($CHR_1$—$CHR_2OH$) as hereinbefore defined or straight or branched chain alkyl groups which may contain up to 22 carbon atoms and contain as substituents for example hydroxyl, carboxyl, ether, ester, mercapto, thioether, keto, cyano, sulphonic acid or sulphuric ester groups.

By alkylene groups we mean aliphatic hydrocarbon groups which contain one double bond for example vinyl, methylvinyl or allyl groups. By aryl groups we mean those groups which are derived from a member of the benzene or naphthalene series, for example phenyl or naphthyl groups. By aralkyl groups we mean alkyl groups which are themselves substituted by an aryl group for example the benzyl group. By alicyclic groups we mean groups which contain a nonbenzenoid cyclic carbon ring, for example the cyclohexyl group. By heterocyclic groups we means groups which contain a closed ring system of atoms of more than one kind for example the pyridyl or quinolyl groups. Any of the aforementioned groups may contain as substituents for example hydroxyl, carboxyl, ether, ester, mercapto, thioether, keto, cyano, sulphonic acid or sulphuric ester groups.

By the sulphation mass we mean the mass which commences as unsulphated sulphonium salt and ends as the sulphated sulphonium salt and which during the reaction consists of a mixture of these products and sulphating agent and which may exist as a separate phase in an inert immiscible liquid diluent.

It is known for example to make tris(beta-hydroxyalkyl) sulphonium halides by the reaction of an alkylene halohydrin with a bis(2-hydroxyalkyl) sulphide, the products obtained being white, crystalline solids. When attempts are made to sulphate these products with the commonly used sulphating agents such as chlorosulphonic acid a viscous sulphation mass is formed which is difficult to agitate and consequently reaction does not always proceed to completion and a poor yield of tris(beta-sulphatoalkyl)sulphonium inner salt is obtained.

We have found that this disadvantage is avoided by ensuring that the sulphation mass is maintained substantially as a liquid phase. This condition obtains when there is present a suitable inert miscible liquid diluent for the sulphation mass or when the sulphonium salt employed is of sufficiently low melting point to be fluid at the temperature of the reaction.

The sulphating agents which may be used in the present invention include oleum, chlorosulphonic acid and sulphur trioxide. Those particularly suitable are chlorosulphonic acid and sulphur trioxide.

The inert miscible diluents for the sulphation mass which are suitable in this invention include dimethyl formamide and dioxan. The inert diluents which are immiscible wth the sulphation mass and whch are preferred in this invention are those which are insoluble in water because they may readily be separated from aqueous solutions of the sulphated sulphonium compounds, and such diluents are exemplified by perchloroethylene, tetrachloroethane, dichlorobenzene, 1:1:1-trichloroethane, chloroform, methyl chloroform, or carbon tetrachloride. It is also particularly advantageous to use a low-boiling inert diluent which may be removed from the sulphation mass by evaporation, for example chloroform, carbon tetrachloride, or 1:1:1-trichloroethane.

The low melting sulphonium salts which may be used in the invention include for example those which have a cation of the general formula:

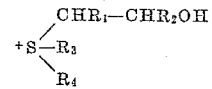

and are obtained by the reaction of a sulphide of the type $R_3$—S—$R_4$ with an alkylene oxide in the presence of an aqueous acid HX, for example sulphuric acid, wherein $R_1$, $R_2$, $R_3$, and $R_4$ are as defined above and HX is a mono- or polybasic, weak or strong acid.

Alternatively, such salts and particularly the sulphonium sulphate salt may be prepared by the reaction of a sulphide of the type $R_3$—S—$R_4$ with an alkylene oxide in the presence of water to form the sulphonium hydroxide and the sulphate prepared therefrom by a neutralisation procedure. It is preferred that the reaction between the sulphide and alkylene oxide be carried out at temperatures between $-20°$ C. and $10°$ C. The neutralisation of the sulphonium hydroxide may be carried out for example with sulphuric acid.

The low-melting sulphonium salts may also be prepared from sulphonium salts of higher melting point by a displacement reaction. For example a sulphonium chloride may be converted to a sulphate by warming with sulphuric acid. The sulphate salt of the sulphonium compound is especially preferred in the present invention since there is then no other acid present to contaminate the final sulphuric ester. If desired the lower melting salt may be prepared in situ from a higher melting salt prior to the addition of the sulphating agent.

In carrying out the process provided by the present invention a number of varying procedures may be employed. For instance, the sulphonium salt may be suspended or dissolved in an inert miscible diluent for the sulphation mass, optionally in the presence of a further inert immiscible diluent, and the mixture is then sulphated by addition of a sulphating agent. Alternatively a solid sulphonium salt may be suspended in an inert immiscible solvent and the solid sulphonium salt then converted into a fluid sulphonium salt, for example the sulphate, by a displacement reaction and the mixture then sulphated by addition of a sulphating agent. Alternatively, a fluid sulphonium salt, for example the sulphate, may be sulphated in the absence of a diluent or in the presence of a miscible or immiscible diluent. Alternatively a fluid sulphonium salt may be added to the sulphating agent in the presence or absence of a miscible or immiscible diluent. Sulphation may be carried out between wide limits of temperature for instance 10° C. to 100° C. and during widely different periods of time for instance ½ hour to 12 hours, but the preferred temperature limits are 40° C. to 60° C., and the preferred time limits ½ hour to 6 hours.

When chlorosulphonic acid is used as sulphating agent hydrogen chloride absorbed in the sulphation mass and/or diluent may be removed from the reaction mixture by blowing with an inert gas stream or by heating the mixture under reduced pressure for instance 25° C. to 60° C. at 200 mm. to 20 mm. pressure. When a low boiling diluent is used the above procedure may conveniently be combined with the removal of solvent by evaporation.

Isolation of the sulphated material may be carried out in a number of ways. For instance the reaction mixture may be diluted with water preferably at a low temperature for example 0–10° C., and the mixture then neutralised by addition of an alkaline reagent for example sodium bicarbonate or sodium carbonate. Alternatively the reaction mixture may be poured into a solution or suspension of an appropriate alkaline reagent, for example barium carbonate or calcium carbonate, and when this method of working up is employed it is essential that the pH of the solution or suspension does not exceed 7.0. The aqueous solution may be separated from any inert immiscible diluents before or after neutralisation. It may be preferred to isolate the disodium salt of the sulphated sulphonium salt and where the neutralisation has been performed so as to give a water-soluble salt other than that of sodium, for example the barium salt, a stoichiometrically equivalent amount of a sodium salt is added to precipitate the undesired cation. The precipitate may then be separated from the aqueous solution of the disodium salt.

If it is desired to isolate salts of the sulphated sulphonium compounds in the solid state they may be conveniently obtained by precipitation from concentrated aqueous solutions by an addition of an appropriate water-miscible solvent, for instance methanol, or alternatively by evaporation of solutions of water or an aqueous solvent under reduced pressure at low temperatures.

Alkaline reagents which may be used to neutralise the sulphated salt include barium carbonate, sodium carbonate, calcium carbonate, sodium bicarbonate, or potassium bicarbonate. The preferred alkaline reagents are sodium carbonate or sodium bicarbonate.

Depending on their structure those products may be of interest as bactericides or as intermediates for textile auxiliaries.

The invention is illustrated but not limited by the following examples in which parts and percentages are by weight:

Example 1

103 parts of tris(beta-hydroxyethyl) sulphonium sulphate are stirred at 0–5° C. and 168 parts of 20% oleum are added dropwise maintaining the reaction temperature at 13–17° C. by cooling. When addition is complete the mixture is warmed to 25° C. and allowed to stir at this temperature for 1 hour. The syrupy sulphonation mass is poured into a stirred suspension of 250 parts of barium carbonate in 750 parts of water at such a rate as to avoid too vigorous frothing. When the neutralisation is finished the suspension is filtered to yield a solution of the barium salt of tris(beta-sulphatoethyl) sulphonium inner salt. The barium content of the solution is estimated by standard analytical techniques and a stoichiometric amount of sodium sulphate is added in the form of an aqueous solution. The precipitated barium sulphate is filtered off yielding a clear aqueous solution of the disodium salt of tris(beta-sulphatoethyl) sulphonium inner salt.

Example 2

50.6 parts of tris(beta-hydroxyethyl)sulphonium chloride are stirred in 162 parts of sym-tetrachloroethane. The suspension is warmed to 50–55° C. and 12.5 parts of 98.2% sulphuric acid are added yielding a fluid suspension of the sulphonium sulphate. 96.1 parts of chlorosulphonic acid are added dropwise to the stirred mixture at 50–55° C. during 45 minutes, and the reaction mixture is stirred at 50–55° C. for 45 minutes at atmospheric pressure, and for a further 45 minutes at 50–55° C. and a pressure of 60–100 mm. mercury to remove dissolved hydrogen chloride. 337.5 parts of ice-water are rapidly added to the mixture which is then cooled to 0–5° C. as quickly as possible. Solid sodium bicarbonate is added to the mixture in portions until the mixture is no longer acid to Congo red. The mixture is filtered and the lower tetrachloroethane layer separated. The aqueous solution is treated with a small quantity of absorbent or filter aid and filtered. The clear aqueous solution of disodium tris(beta-sulphatoethyl)sulphonium inner salt is adjusted to pH 6.8–6.95 by addition of solid sodium bicarbonate as required.

Example 3

50 parts of tris(beta-hydroxyethyl)sulphonium chloride are suspended in 150 parts of chloroform and 97 parts of chlorosulphonic acid added dropwise, keeping the reaction temperature below 30° C. by cooling.

When no more gas is evolved 150 parts of dimethylformamide are added slowly with cooling, as a vigorous reaction occurs. A homogeneous solution is obtained from which hydrogen chloride and chloroform are removed by heating at 30–40° C. under vacuum. The solution is then added slowly to a stirred slurry of 70 parts barium carbonate and 200 parts water cooled in ice. The resulting solution is filtered from the insoluble barium salts, the barium content estimated by the standard analytical techniques, and a stoichiometric amount of sodium sulphate added in the form of an aqueous solution. The precipitated barium sulphate is filtered off giving a clear aqueous solution of the disodium tris(beta-sulphatoethyl)sulphonium inner salt. Methanol is added until the salt begins to precipitate and the methanol and water are removed under vacuum at room temperature leaving a white, extremely hygroscopic, material which is washed with ethanol and dried at 35–40° C. in a vacuum oven.

Example 4

Thiodiglycol (122 parts) and water (305 parts) are stirred at 0–2° C. whilst ethylene oxide (44 parts) is added. The mixture is allowed to stand at 0° C. for 60 hours. The product which contains tris-β-hydroxyethyl sulphonium hydroxide (approx. 75 g. as determined by titration with standard acid) is neutralised with sulphuric acid and evaporated to dryness at 60° C. under reduced pressure. The last traces of water are removed by azeotropic distillation with chloroform (methyl chloroform or carbon tetrachloride are also satisfactory), the residual oil is cooled to 0 to −10° C. and the sulphonium salt is precipitated by addition of absolute ethanol. After decantation of the methanol liquor, the sticky sulphonium sulphate is treated either in a current of air or under reduced pressure at 15–20° C. to remove residual ethanol and sulphated by the method of Example 1.

Example 5

543 parts of an aqueous solution containing 66–67% of tris(β-hydroxyethyl)sulphonium compounds, calculated as the sulphate and prepared by the reaction of thiodiglycol with ethylene oxide in the presence of aqueous sulphuric acid, are dehydrated by vacuum evaporation, to yield 435 parts of a viscous syrup containing 81–83% of tris(beta-hydroxyethyl)sulphonium compounds, calculated as the sulphate, and less than 1% of water. The vacuum-evaporated syrup so obtained is stirred, 1140 parts of methylchloroforms are added, and the mixture is warmed to 50° C. 769 parts of chlorosulphonic acid are then added slowly, during 3 hours, maintaining the reaction temperature at 50–55° C., and the mixture is then heated at 50–55° C. for 1 hour. The mixture is cooled to 25° C. and as much of the supernatant methylchloroform layer as possible is removed by suction. The remaining methylchloroform is removed by vacuum evaporation. The viscous sulphation mass is dissolved in a slurry of 900 parts of ice in 1800 parts of water and the mixture neutralised to pH 4–5 with approximately 640–660 parts of solid sodium bicarbonate maintaining the temperature at 0–5° C. 35 parts of a phosphoric acid activated wood carbon and 35 parts of Hyflo-Supercel (registered trademark) are added. The temperature is raised to 23–25° C., the mixture is stirred for 1 hour and filtered to yield 3825–3875 parts of a clear, substantially colourless, aqueous solution containing 18.7–19.3% of disodium tris($\beta$-sulphatoethyl) sulphonium inner salt.

*Example 6*

543 parts of an aqueous solution containing 66–67% of tris($\beta$-hydroxyethyl)sulphonium compounds, calculated as the sulphate, are dehydrated as described in Example 5. 1400 parts of perchloroethylene are added and the mixture is sulphated with 769 parts of chlorosulphonic acid at 50–55° C. as described in Example 5. After cooling the reaction mixture to 25° C. it is added to a slurry of 900 parts of ice and 1800 parts of water and the lower layer of perchloroethylene is separated off. The aqueous solution is neutralised to pH 4.5 and isolated as described in Example 5, to yield 3825–3875 parts of a clear, substantially colourless, aqueous solution containing 18.3–18.9% of disodium tris($\beta$-sulphatoethyl)sulphonium inner salt.

*Example 7*

435 parts of a substantially dehydrated syrup containing 81–83% of tris($\beta$-hydroxyethyl)sulphonium compounds, calculated as the sulphate, is stirred and heated to 50° C. 30 parts of methylchloroform are added and the mixture is sulphated at 50–55° C. with 769 parts of chlorosulphonic acid which is added during 6 hours. A dry stream of nitrogen is then passed through the mixture for 1–1½ hours in order to remove hydrogen chloride and methylchloroform and the product is then worked up as described in Example 5.

*Example 8*

769 parts of chlorosulphonic acid and 30 parts of methylchloroform are stirred and heated to 50–55° C. 435 parts of a substantially dehydrated syrup containing 81–83% of tris($\beta$-hydroxyethyl)sulphonium compounds, calculated as the sulphate, is then added slowly during 3 hours, maintaining the reaction temperature at 50–55° C. and the product is then blown with nitrogen and worked up as described in Example 5.

*Example 9*

231 parts of ethyl-bis($\beta$-hydroxyethyl)sulphonium bromide and 615 parts of methylchloroform are stirred together and 50 parts of 98% sulphuric acid are added yielding a suspension of the fluid sulphonium sulphate in methylchloroform. The mixture is stirred at 50–55° C., and 257 parts of chlorosulphonic acid are added during 3 hours, maintaining the reaction temperature at 50–55° C. After stirring for a further hour at 50–55° C. the product is worked up in a similar manner to that described in Example 5, using 330 parts of ice, 660 parts of water and approximately 280 parts of solid sodium bicarbonate to yield a clear, pale yellow, aqueous solution containing 15–17% of sodium ethyl-bis($\beta$-sulphatoethyl)sulphonium inner salt.

*Example 10*

81.4 parts of bis-($\beta$-hydroxyethyl)-mono hydroxypropyl-sulphonium sulphate of strength 55.5% and 268.5 parts of methylchloroform are stirred at 50–55° C. whilst 96 parts of chlorosulphonic acid are slowly added. The mixture is stirred at 50–55° C. for a further hour, cooled to 35° C., the solvent layer removed by decantation and the last traces of methylchloroform removed at 30–35° C. in vacuo. The residue is dissolved in 337.5 parts of water at 45° C., cooled to 0–2° C., neutralised with sodium bicarbonate, filtered, charcoal added, and again filtered. There is obtained a pale yellow aqueous solution containing 18% of disodium disulphatoethyl monosulphatopropyl sulphonium inner salt.

*Example 11*

42 parts of tris(hydroxypropyl)sulphonium sulphate of strength 54.1% and 175 parts of methylchloroform are stirred together at 50–55° C. whilst 63.8 parts of chlorosulphonic acid are slowly added. After stirring at 50–55° C. for a further 1 hour the product is worked up in a manner similar to that disclosed in Example 10 using 225 parts of water to dissolve the sulphated product. There is obtained a pale yellow aqueous solution containing 18% w./w. of disodium trissulphatopropyl sulphonium sulphate.

What we claim is:

1. Process for the preparation of sulphated sulphonium inner salts which comprises reacting in a fluid, easily stirrable mixture, a sulphating agent and a sulphonium salt of the formula

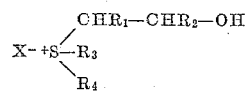

wherein $R_1$ and $R_2$ are selected from the group consisting of hydrogen and lower alkyl, $R_3$ and $R_4$ are selected from the group consisting of alkyl, aryl, benzyl vinyl, methyl vinyl, allyl, cyclohexyl, pyridyl and quinolyl radicals and any of said radicals substituted with a member of the group consisting of hydroxyl, carboxyl, ether, mercapto, thioether, keto, cyano, sulfonic acid and sulfuric ester groups and $X^-$ is the anion of an acid.

2. The process according to claim 1 wherein the fluid mixture contains an inert miscible organic liquid diluent.

3. The process according to claim 1 wherein the fluid mixture contains an inert immiscible organic liquid diluent.

4. Process according to claim 1 wherein the sulphating agent is selected from the group consisting of oleum, chlorosulphonic acid and sulphur trioxide.

5. Process according to claim 1 wherein the fluid sulphonium salt employed is the sulphate.

6. Process according to claim 5 wherein the fluid sulphonium salt employed is a tris(beta-hydroxyalkyl)sulphonium sulphate.

7. Process according to claim 1 wherein the sulphation reaction is carried out at 10–100° C. for ½–12 hours.

8. Process according to claim 1 which includes suspending said sulphonium salt in the solid form in an inert immiscible solvent and converting said sulphonium salt into a fluid sulphonium salt by a displacement reaction and sulphating the mixture by addition of the sulphating agent.

9. Process according to claim 2 wherein the inert miscible diluent is selected from the group consisting of dimethyl formamide and dioxan.

10. Process according to claim 3 wherein the inert diluent immiscible with the sulphation mass is insoluble in water.

11. Process according to claim 10 wherein the inert diluent immiscible with the sulphation mass is selected from the group consisting of perchloroethylene, tetrachloroethane, dichlorobenzene, 1:1:1 - trichloroethane, chloroform, methyl chloroform and carbon tetrachloride.

12. The process according to claim 7 wherein the fluid mixture contains a sulphonium salt which is fluid under the reaction conditions.

13. The process according to claim 7 wherein the fluid mixture contains an inert immiscible organic liquid diluent.

14. The process according to claim 13 wherein the immiscible organic liquid diluent is insoluble in water.

15. The process according to claim 14 wherein the immiscible organic liquid diluent is selected from the group consisting of perchloroethylene, tetrachloroethane, dichlorobenzene, 1,1,1-trichloroethane, chloroform, methyl chloroform and carbon tetrachloride.

16. Process for the preparation of a sulphated sulphonium inner salt which comprises reacting tris (beta-hydroxyalkyl) sulphonium sulphate with a sulphating agent selected from the group consisting of oleum, chlorosulphonic acid and sulphur trioxide at a temperature of 40–60° C. for 0.5–6 hours.

References Cited by the Examiner

UNITED STATES PATENTS

| 2,691,040 | 10/54 | Bloch et al. | 260—457 XR |
| 2,708,657 | 5/55 | Slagh | 260—457 |

FOREIGN PATENTS 47,782  6/40  Netherlands.

CHARLES B. PARKER, *Primary Examiner.*